June 19, 1951 — E. FULPIUS — 2,557,423
STRAIGHT NEEDLE VALVE INJECTOR FOR
HYDRAULIC ACTION TURBINES
Filed Feb. 27, 1946 — 2 Sheets-Sheet 1

INVENTOR
EDMOND FULPIUS,
BY
ATTORNEY

June 19, 1951 — E. FULPIUS — 2,557,423
STRAIGHT NEEDLE VALVE INJECTOR FOR
HYDRAULIC ACTION TURBINES
Filed Feb. 27, 1946 — 2 Sheets-Sheet 2
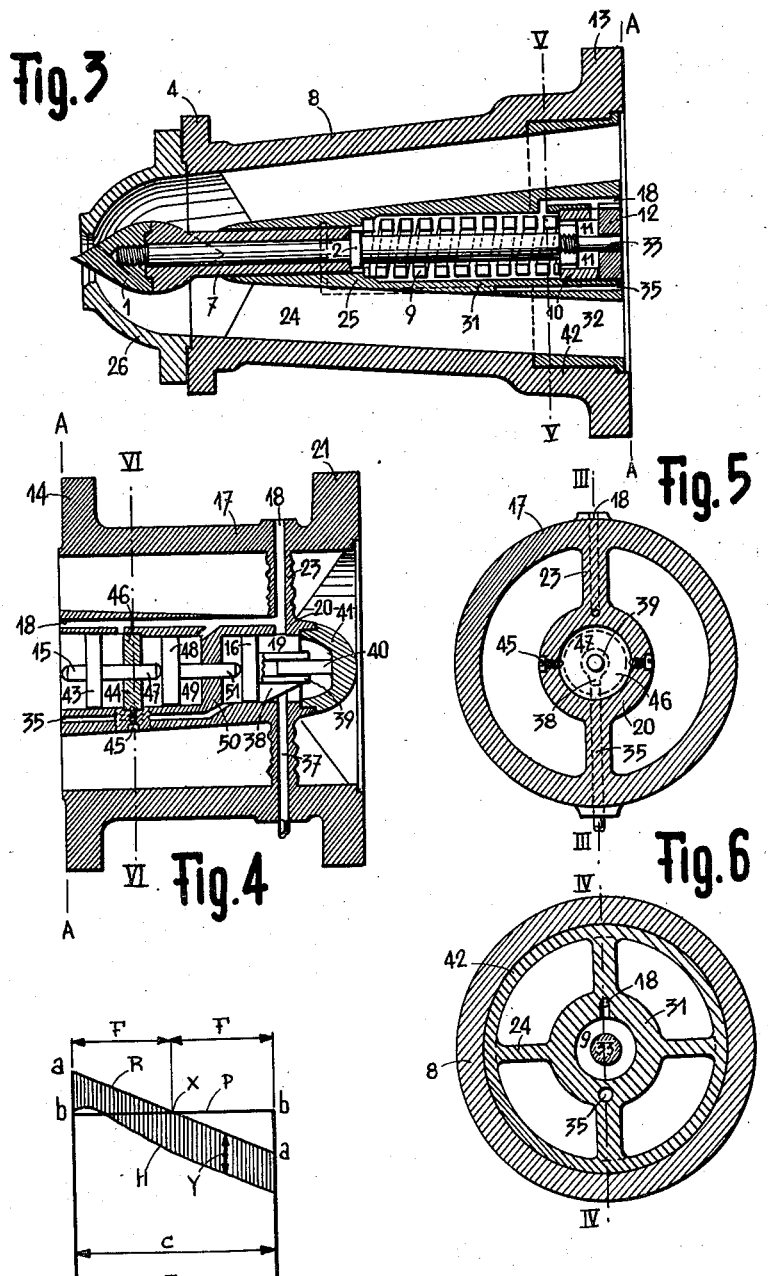
INVENTOR
EDMUND FULPIUS,
BY
ATTORNEY Patented June 19, 1951

2,557,423

UNITED STATES PATENT OFFICE 2,557,423

STRAIGHT NEEDLE VALVE INJECTOR FOR HYDRAULIC ACTION TURBINES

Edmond Fulpius, Geneva, Switzerland, assignor to Ateliers des Charmilles S. A., Geneva, Switzerland, a corporation of Switzerland Application February 27, 1946, Serial No. 650,607
In Switzerland June 21, 1945

6 Claims. (Cl. 253—136)

The object of the invention is a straight needle valve injector for a hydraulic action turbine, in which the needle is provided with a stem sliding in a sleeve containing all the organs for balancing, controlling and interlocking the needle, the latter two groups of organs communicating with the exterior of the injector through ducts provided in guiding ribs holding the sleeve coaxially in the injector.

All hydraulic action turbine injectors, whether curved or straight, when disassembled, must be moved upstream a distance equal to the amount they project within the turbine housing.

With curved injectors, this motion can take place after merely loosening the assembly flanges of the injector with the supply main, and tilting the whole injector in its axial plane, the flanges being provided with joints for this purpose.

With straight injectors however, this motion can take place only after a short tube-section provided for this purpose between injector and main has been removed. The use of such a tube-section increases naturally the length of the machine hall by an amount equal to the length of the former, in a place which must be accessible to the crane, whereby the cost of the installation is increased.

With the injector, object of the present invention, such an inconvenience is avoided by the fact that the injector comprises two sections assembled along a plane perpendicular to its axis, the upstream section playing the role of a dismantling section for the downstream section and owing to the fact that motion transmitting means mechanically connect the needle with the control organs distributed in both sections, said means comprising at least two members meeting in a second plane perpendicular to said injector axis. Further means are provided for automatically bringing the plane of contact of both of said organs in the junction plane of the two injector sections in such a manner that no part protrudes and hinders the removal of the upstream section when said needle is in its middle or rest position.

The annexed drawing shows by way of example a form of embodiment of the injector.

Figure 3 is a longitudinal section taken on line III—III in Figure 5 of the downstream section of a small diameter injector;

Figure 4 is an enlarged longitudinal section taken on line IV—IV of Figure 6 of the upstream section of the small diameter injector;

Figure 5 is a cross sectional view viewed from downstream and taken on line V—V in Figure 3 of the small diameter injector;

Figure 6 is a cross sectional view taken on the line VI—VI of Figure 4;

Figure 7 is a diagram showing the operation of the injector.

Figure 1:
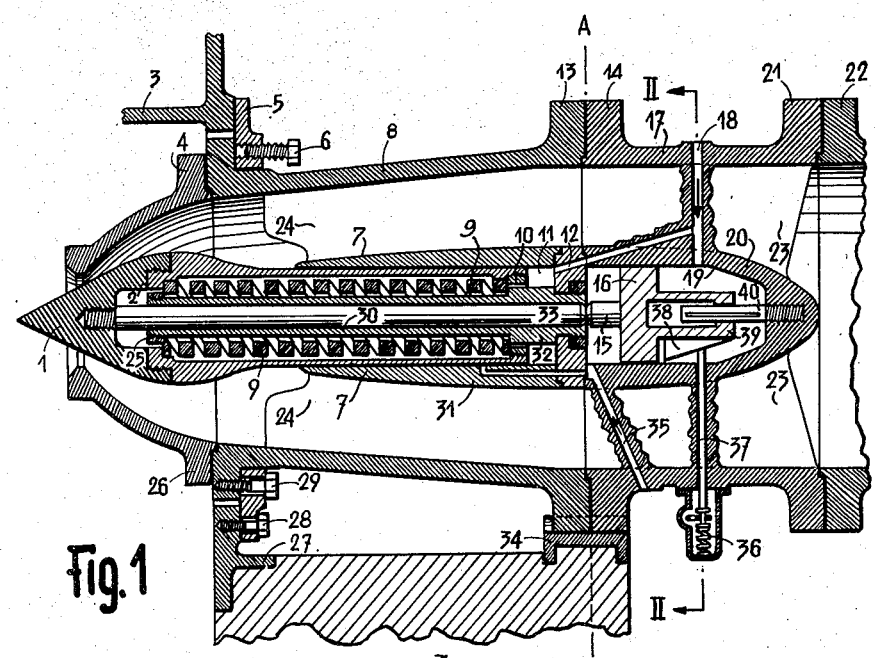
Fig. 1 is an axial section of a large diameter injector along line I—I of Fig. 2.

The body of the injector is made up of a downstream section 8 and an upstream section 17, provided with assembly flanges 13 and 14 respectively. Downstream section 8 is further provided with a flange 4 for assembly to the housing 3 of a turbine not represented. On flange 4 is also fastened the nozzle 26 of the injector. Upstream section 17 is provided also with a flange 21 for assembly with flange 22 provided either on the supply main or on a supply valve.

Needle valve 1 is borne by a hollow piston 7 sliding in a guiding shell 31. This shell is coaxial with the downstream section and terminated to the right by a cover 12. The latter together with shell 31 and a piston 7 constitute a single action servo-motor controlled by oil pressure for axially moving the needle with respect to nozzle 26.

Shell 31 is rigidly connected to the body of the downstream section by means of six radial ribs forming a water guiding spider.

As usual in such devices, means are provided for eliminating on one hand the water creeping between piston 7 and sleeve 31 and on the other hand, the oil forced under pressure for lubricating these surfaces. These means may consist in ring seals located in the sleeve and connected to the outside of body 8 through ducts provided in ribs 24.

An inner tube 30, fastened to cover 12 and provided with two external shoulders 25 and 32, hollow piston 7 provided with two internal shoulders 2 and 10 and a helical spring housed therebetween serve for balancing the water pressure exerted on the needle.

With such an arrangement, already used in curved injectors with external control, during the regulating action of the needle spring 9 undergoes a deformation equal to one half of the total needle displacement on each side of the middle position of the latter with the well known advantage of reducing the required length and cross-section of the spring and hence the dimensions of the injector.

A hollow body 20 in the form of a rounded off cylinder at one end is fastened coaxially in upstream section 17, with the apex pointing upstream, by means of two radial ribs 23 located along a diametral plane. Hollow body 20 as well as ribs 23 are jointed to sleeve 31 and to two of the ribs 24 of the downstream section respectively in the transversal plane A—A, where both sections meet in such a way that the water path remains straight and without dead spaces apt to cause eddies. A piston 16 sliding in hollow body 20 constitutes with the latter a second single acting oil-pressure servo-motor for the control of the needle. Piston 16 has a short axial projection 15 with its free end located exactly in plane A—A as shall be explained later when the needle is in its middle position. A rod 33, fastened to the front end of needle 1, slides in tube 30 and abuts with its free end against projection 15. The same enters the bore of inner tube 30 with shoulder 32 when the servo motor moves needle valve 1 and rod 33 to the left. Piston 16 has a hub 39 sliding over an axle 40 fastened in the pointed end of body 20. This hub carries a cam 38 actuating a rod 37 located in a radial cylindrical hole provided in the lower rib 23 of the body 17. Rod 37 is kept in contact with cam 38 by means of a spring 36 enclosed in a housing subjected to the oil pressure, said housing supporting the end of a shaft actuated by rod 37. This arrangement constitutes an interlocking device translating the axial displacements of the needle into angular displacements of said shaft.

Inner chamber 19 of the upstream servomotor and 11 of the downstream servo-motor are connected to an externally located regulating organ (not represented) acting on the oil pressure in these chambers. Said connection is obtained through an orifice 18 of ducts provided in the upper wall 23 and in bottom 12 and a tubing not represented. A duct 35 provides for the elimination of oil leaking from pistons 7 and 16 and rod 33. A two-piece removable flange 5 is centered on body 8 and fastened on the upstream side of flange 4 by means of screws 29 and the turbine housing by screws 28, said removable flange being further equipped with pressure screws 6.

A foundation and centering member 34 for the injector is provided under flanges 12 and 14.

Spring 9 permits a limited motion of the needle to the right or left (Fig. 1). When the injector is under water pressure, a certain mean fluid pressure in chambers 11 and 19 is necessary to balance the opening thrust exerted on the needle by the said water pressure. If the fluid pressure in chambers 11 and 19 exceeds the aforesaid mean pressure, the needle will move to the left and will compress spring 9 from right to left until the needle reaches completely closed position, whereas if the fluid pressure in chambers 11 and 19 falls below the aforesaid means pressure, the needle will move to the right and will compress spring 9 from left to right until the needle reaches completely open position. The position of the needle can therefore be adjusted to any position between closed and full open positions by varying the fluid pressure in chambers 11 and 19.

During the motion of piston 16 to the left and to the right, cam 38 permits rod 37 which is permanently thrust into a sliding contact with cam 38 by spring 36 to move inwardly and outwardly and to control, by motion transmitting means not shown on the drawing, such devices as the needle of a standard opening indicator, or the compensating mechanism of a normal speed governor, neither of which are shown on the drawing.

In the second form of execution according to Figs. 3 and 6 as the spring 9 of the needle balancing device cannot be placed inside piston 7 by reason of its too small diameter, it is arranged on the upstream side of the piston between two shoulders 25 and 32 of prolonged shell 31 and two shoulders 2 and 10 with which is provided rod 33 connecting the needle to the operating mechanism placed in the upstream section after having crossed the cover 12 as in the case of the injector shown on Fig. 1.

As the external diameter of shell 31 is determined by the flow section of the injector and as the oil pressure is generally given by the mechanism controlling the turbine opening, the force required to close the needle may necessitate more than two servomotors as shown in Fig. 1, for example four servomotors as shown in Figs. 3 and 4. One of the servomotors, that made up of piston 7, shell 31 serving as cylinder and cover 12, is arranged in the downstream section of the injector while the three others are arranged end to end coaxially in the hollow body 20 of the upstream section.

44 is the cylinder of the first of these servomotors and 43 its piston which is provided on one side with a projection 15 butting up against the extremity of rod 33 of the piston of the servomotor in the downstream section and on the other side with an upstream rod 47 crossing through a stationary cover 46 secured by screws 45 and a circular shoulder created by giving the second servomotor a smaller bore than the first. 49 is the cylinder of the second servomotor and 48 its piston, the downstream side of which butts against the extremity of rod 47 of the piston of the first servomotor and transmits to it its closing thrust. 51 is the rod on the upstream side of piston 48 which crosses the cover 50 shown as being cast integral with the hollow body 20 but which could be secured in the same manner as cover 46. 19 is the oil pressure cylinder of the third servomotor, 16 its piston, the downstream side of which butts against the extremity of rod 51 of the piston of the second servomotor and which transmits to it its closing thrust. 39 is the hub of piston 16 which slides on a stem 40 secured to the oval shaped cover 49 closing the hollow body 20 on its upstream extremity. 37 and 38 are devices transmitting the movements of the needles to the exterior of the injector in the same manner as described for the first form of execution according to Fig. 1. 18 are oil pressure ducts leading the oil pressure into cylinders 11, 19, 44 and 49 of the four injector servomotors, ducts 35 collect the oil leakage of the pistons and the rods of these servomotors. These ducts are provided in the guide vane 23 in the same maner as described for the arrangement according to Fig. 1.

To facilitate the machining of the walls of guide vanes 24 and the inner surface of body 8 of the downstream section of the injector, particularly when the latter is small, these guide vanes 24 could be cast integral as shown on Figs. 3 and 6, with a ring 42 having an internal diameter corresponding with that of the body in order to make with this ring and the hollow body 21 an independent spider adjusted inside body 8.

The functioning of the injectors according to the invention is similar to that of other known injectors in which the needle balancing device has not to perform an absolutely tight closing of the nozzle. In order to insure such a tight closing when the turbine is at stand-still, it is necessary with the described form of embodiment of the injector, just as with said other known injectors, for oil under pressure to be provided from a source independent from the turbine (storage tank, hand- or motor-pump).

Figure 2:
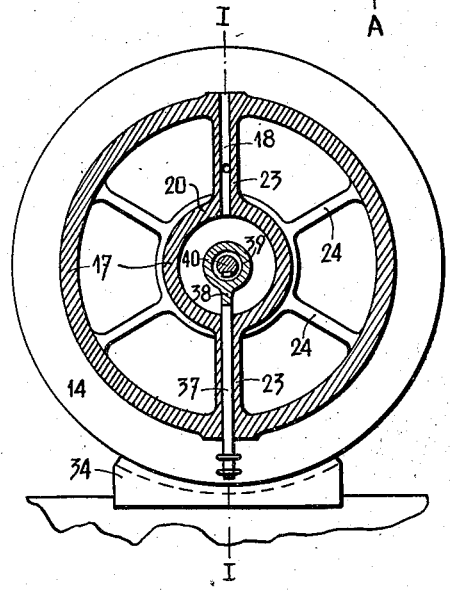
Fig. 2 is a cross section of the injector as seen from the upstream side, along line II—II of Fig. 1.

The dismantling of the injector of Figures 1 and 2 located between supply main and turbine takes place in the following manner:

After removal of screws 29 holding together flange 4 and removable flange 5 and after removing the clamping means holding together flanges 13 and 14, the downstream section is caused to slide downstream through removable flange 5 and over foundation member 34 by means of pressure screws 6 by an amount slightly in excess to the sum of the projections of flanges 14 and 22. The upstream section being thus liberated, may be then taken away transversely under the condition that the free end of rod 33 does not project to the right of junction plane A—A of the two sections. This condition is satisfied owing to the fact that, as stated above, spring 9 causes the needle to take a rest position in which the end of rod 33 comes precisely in plane A—A. After the removal of the upstream section and of screws 28, the downstream section may be moved axially to the right until the needle clears the flange of the turbine shell and then removed.

By assembling the injector, the reverse process shall be followed.

I claim:

1. A straight flow injector for hydraulic impulse turbine comprising a body including a downstream section and an upstream section joined in end-to-end relation, a regulating needle guided in the downstream section, a member guided in the downstream section and engaging the needle and operable to transmit to the needle motion away from the upstream section, a fluid pressure motor in the upstream section and including a second motion transmitting member engaging with the first transmitting member, and yieldable means reacting against one of the sections and urging at least one of the transmitting members to a position in which neither of the transmitting members projects across the plane of junction between said sections whereby the injector may be dismantled by moving the upstream section transversely, thus permitting the removal of the downstream section.

2. The injector according to claim 1 and wherein the two transmitting members are coaxial and in end-to-end relation and the yieldable means includes a spring held compressed between two stationary shoulders in the downstream section and engageable at either end by shoulders on the needle, whereby when the needle is free from the action of water pressure and of the fluid motor, the spring will hold the needle in a position disposing the surface of contact between the transmitting members in the plane of junction between the two sections.

3. In a straight flow injector for hydraulic impulse turbines, the combination comprising, a regulating needle, a fluid pressure motor, means transmitting motion to the needle, a body consisting of a downstream section housing the needle and the transmitting means, and of an upstream section joined to the downstream section in end-to-end relation and housing the motor, other transmitting means engaging the first transmitting means, and yieldable means reacting against the body and urging one of the transmitting means to a position in which neither transmitting means projects across the plane of junction between the sections whereby the injector may be dismantled by moving the upstream section transversely, thus permitting the removal of the downstream section.

4. In a straight flow injector for hydraulic impulse turbines, the combination comprising, a regulating needle, a fluid pressure motor, a body consisting of a downstream section terminating in a nozzle and housing the regulating needle, a stem in the downstream section and carried by the needle and constituting means transmitting motion thereto, the body also including an upstream section housing the motor including a rod coaxial with the needle stem and constituting a second transmitting means engaging the first transmitting means, a fluid tight shell guiding the needle stem, radial ribs holding the shell coaxial with the body, a spring within the shell and urging the needle to a position wherein the coacting ends of the stem and rod lie in the plane of junction of the two sections, whereby the injector may be dismantled by moving the upstream section transversely, thus permitting the removal of the downstream section.

5. The combination of claim 4 and wherein the spring is arranged between four shoulders two of which are stationary and rigid with the downstream section and two of which are movable with the needle and wherein the coincidence of the contact surfaces of the stem and rod is attained when each extremity of the spring is engaged by a stationary and movable shoulder.

6. The combination of claim 4 and comprising a piston carried by the needle and slidable in the shell, the piston and shell constituting a second fluid pressure motor controlling the regulating needle.

EDMOND FULPIUS.

REFERENCES CITED

The following references are of record in the file of this patent:

UNITED STATES PATENTS

| Number | Name | Date |
| --- | --- | --- |
| 656,104 | Fricot | Aug. 14, 1900 |
| 871,321 | Cassel | Nov. 19, 1907 |
| 1,333,509 | Seewer | Mar. 9, 1920 |

FOREIGN PATENTS

| Number | Country | Date |
| --- | --- | --- |
| 563,297 | France | Sept. 22, 1923 |